United States Patent [19]

Shiota et al.

[11] Patent Number: 4,535,413
[45] Date of Patent: Aug. 13, 1985

[54] HUE IDENTIFYING APPARATUS

[75] Inventors: Kazuo Shiota; Taizo Akimoto, both of Minamiashigara, Japan

[73] Assignee: Fuji Photo Film Co., Ltd., Japan

[21] Appl. No.: 384,238

[22] Filed: Jun. 2, 1982

[30] Foreign Application Priority Data

Jun. 18, 1981 [JP] Japan .................................. 56-94350

[51] Int. Cl.³ ............................. G03F 3/08; G01J 3/46
[52] U.S. Cl. ...................................... 364/526; 355/38; 358/80; 364/571
[58] Field of Search ............... 364/525, 526, 571, 577, 364/723, 853; 355/38; 358/80

[56] References Cited

U.S. PATENT DOCUMENTS

| | | | |
|---|---|---|---|
| 4,060,829 | 11/1977 | Sakamoto | 358/80 |
| 4,168,121 | 9/1979 | Freier et al. | 355/38 |
| 4,231,097 | 10/1980 | Shibayama et al. | 364/577 |
| 4,244,654 | 1/1981 | Asai et al. | 355/38 X |
| 4,314,274 | 2/1982 | Atoji et al. | 358/80 |
| 4,328,515 | 5/1982 | Wellendorf | 358/80 |
| 4,334,240 | 6/1982 | Franklin | 358/80 X |
| 4,335,398 | 6/1982 | Yamada | 358/80 |
| 4,346,402 | 8/1982 | Pugsley | 355/38 X |
| 4,414,635 | 11/1983 | Gast et al. | 364/526 |

FOREIGN PATENT DOCUMENTS 2032633  5/1980  United Kingdom ................ 355/38

Primary Examiner—Errol A. Krass
Assistant Examiner—Kevin J. Teska
Attorney, Agent, or Firm—Murray, Whisenhunt and Ferguson

[57] ABSTRACT

A hue identifying apparatus for use in color printing, comprising a device for creating high and low order address signals from the difference between a combination of two of the red, green and blue density signals read out at each point on a color photographic film and from that between another combination of two of said signals, and a hue region memory storing at each address the hue information based on a predetermined hue region defined in a two-dimensional coordinate system wherein the axes represent quantized values of the density differences. The address is designated by the high and low order address signals. The apparatus may further have a device for detecting inadequate exposure on the basis of the three-color density signals, and a device for obstructing the transfer of the hue information from the hue region memory or for selecting one of a plurality of hue region memories based on the output of the inadequate exposure detecting means.

11 Claims, 5 Drawing Figures

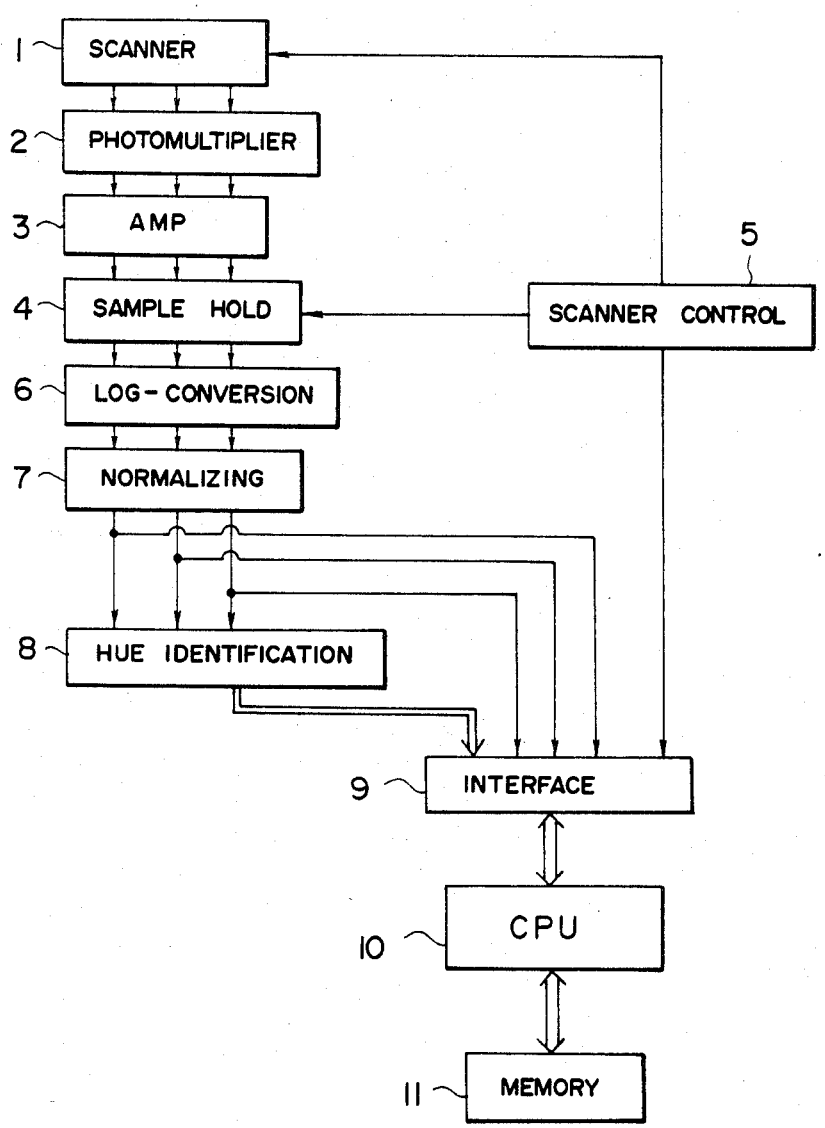
F I G. I

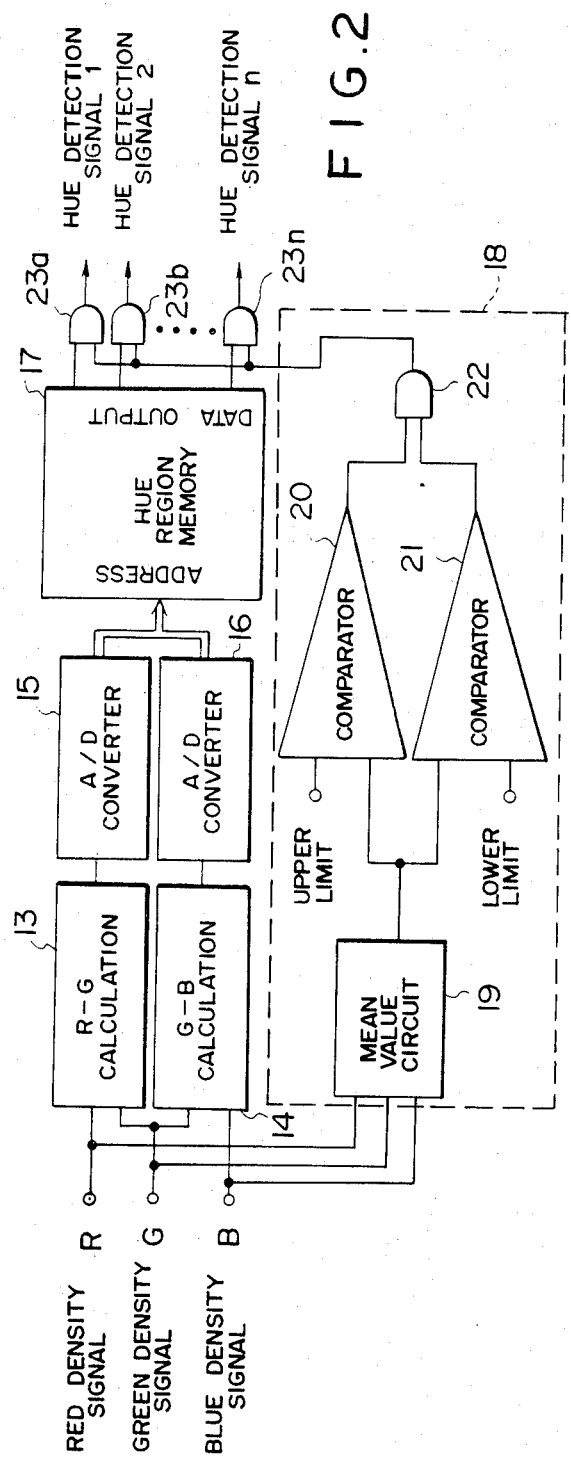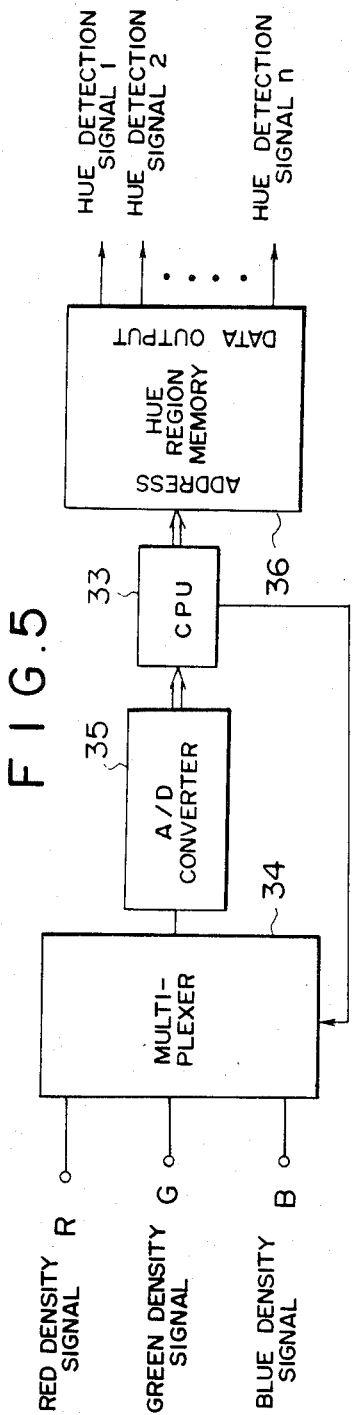

HUE IDENTIFYING APPARATUS

BACKGROUND OF THE INVENTION

1. Field of the Invention

This invention relates to a hue identifying apparatus for use in color printing, and more particularly to an apparatus for determining whether a predetermined hue is contained in a color photographic film.

2. Description of the Prior Art

Among the objects which are commonly recorded on color photographic film, many have hues which are well known. These include, for example, the faces of people, the blue sky, lawns, snow and the like. The fact that these hues are well known makes the work of finishing them particularly interesting. Therefore, it has been proposed to define the hue of a given object in advance, investigate whether the defined hue is contained in each section of the image area, and print the image so as to satisfactorily finish the defined hue when the quantity of the hue contained in the image area is more than the predetermined value.

In this printing method, a hue extracting system is used to determine the existence of the predetermined hue in the image area. The hue extracting system consists of a scanner for scanning each section of the image area, a measuring device for measuring the transmitted light at each scanning spot to obtain blue, green and red density values, an operation means for compensating for differences in the characteristics of photosensitive materials and determining normalized densities of the three colors corresponding to the exposure of the object, and a hue identifying apparatus for determining on the basis of the normalized three-color densities whether the hue of the object is identical with the predetermined one.

In a conventional hue identifying apparatus, for example as described in Japanese unexamined Patent Publication No. 53(1978)-145621, a predetermined region is defined by a polygon drawn on an orthogonal coordinate system, with a combination of two color densities of the three as a coordinate axis and another combination of two color densities as the other axis, and a plurality of equations are used to determine whether the hue at each point of the image area is included in the predetermined region. With the conventional apparatus, however, a comparator is used to conduct the calculation of the equations. Therefore, when the shape of the hue region is complicated, it becomes necessary to use many comparators and the construction of the apparatus becomes complicated.

Further, with the above-described conventional apparatus, different sets of equations must be used for different hue regions. This necessitates a change in the reference voltage of the comparator, so that troublesome adjustments are required.

Furthermore, when a plurality of hues are to be detected, it is necessary to construct circuits for the respective hues, making it necessary to provide a complicated and expensive apparatus.

In addition, in case the hue region is defined in terms of an orthogonal coordinate system, the linearity of the characteristic curve of the color photographic film cannot be maintained at the under-exposure and over-exposure sections. Particularly, at the extreme under-exposure and extreme over-exposure sections, the image information disappears, and data corresponding to the hue of the object cannot be obtained by normalization based on gamma compensation and sensitivity compensation. Particularly at the extreme under-exposure section, the hue deviates greatly with fluctuation of the mask density and very small differences in the normalizing conditions.

SUMMARY OF THE INVENTION

The primary object of the present invention is to provide a hue identifying apparatus having a simple construction and capable of identifying a plurality of hues even if the shapes of the hue regions are complicated.

Another object of the present invention is to provide a hue identifying apparatus in which the predetermined hue region can be changed easily.

The specific object of the present invention is to provide a hue identifying apparatus capable of correctly identifying hues even in the case of inadequate exposure.

In the present invention, a predetermined region is defined by use of a two-dimensional coordinate system, with one axis representing the quantized difference between a set of two of the normalized three-color density signals and the other axis representing that between another set of the normalized three-color density signals. A hue is identified by use of a hue region memory storing data on the defined hues, with the coordinates as the data addresses. Accordingly, it is possible to identify the hue at each measuring point by determining the density difference signals corresponding to the coordinate axes based on the normalized three-color density signals read from the measuring point, and accessing the hue region memory by use of the quantized density difference signals as the address signals.

When the exposure is inadequate, it is impossible to correctly identify the hues. Therefore, in one embodiment of the present invention, an inadequate exposure detecting means is employed and, when the exposure at the measuring point is inadequate, hue identification is not conducted or the hue region is shifted to identify the hues.

Inadequate exposure can be detected by determining whether the mean value or the weighted mean value of the three-color density values is within a certain range. More preferably, the condition of the exposure is detected by investigating whether each of the three-color density values is on the straight line portion of the respective characteristic curve. In the latter case, the maximum and the minimum are determined for each of the three-color densities, and for example a window comparator is used to investigate whether all of the density values are within the range between the maximum and the minimum.

BRIEF DESCRIPTION OF THE DRAWINGS

FIG. 1 is a block diagram showing a hue extracting system in which an embodiment of the apparatus in accordance with the present invention is employed, FIG. 2 is a block diagram showing an embodiment of the apparatus in accordance with the present invention, FIG. 2A shows the sequence of operations corresponding to the apparatus of FIG. 2, FIG. 5 is a block diagram showing another embodiment of the apparatus in accordance with the present invention, and FIG. 5A shows the sequence of operations corresponding to the apparatus of FIG. 5.

DESCRIPTION OF THE PREFERRED EMBODIMENTS

Figure 3:
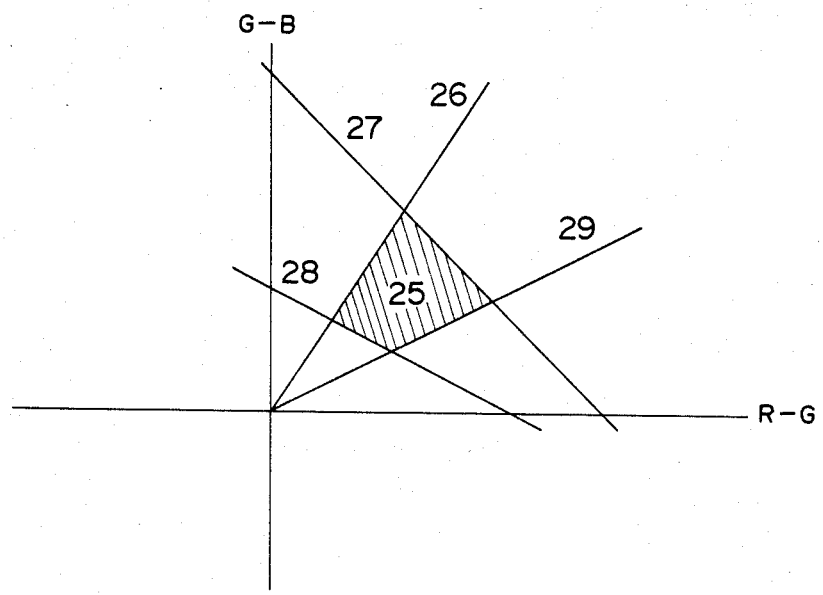
FIG. 3 is a graph showing a hue region identified by a conventional hue identifying apparatus.

The present invention will hereinbelow be described in further detail with reference to the accompanying drawings.

Referring to FIG. 1 showing a hue extracting system in which an embodiment of the hue identifying apparatus in accordance with the present invention is employed, each section of the image area of a color photographic film (color negative or positive film) is scanned by a scanner 1. Light transmitted through (or reflected from) the color photographic film is separated into blue, green and red light rays by a color separating optical elements. The three light rays thus separated are then photoelectrically converted by a light detector, for example, by a photomultiplier 2 for blue, green and red.

Each of the three-color signals output from the photomultiplier 2 is independently amplified by an amplifier (preamplifier) 3 and then sampled by a sample hold circuit 4. Each signal in the sample hold circuit 4 is sampled with a sampling pulse sent from a scanner control circuit 5. The scanner control circuit 5 controls the scanning section of the scanner 1 and, therefore, sampling occurs synchronously with the scanning of the scanner 1. In this way, many measuring points regularly arranged on the image area of the color photographic film are obtained. For example, when the color photographic film is of a 35 mm size, the 22×34 mm area inside the peripheral edges is scanned at 1 mm intervals with a light dot having a diameter of 1 mm. Therefore, the image area is measured at 748 (=22×34) measuring points.

The color signals of each measuring point, which have been sampled by the sample hold circuit 4 are sent to a log-conversion circuit 6 and converted to a blue density signal DB, a green density signal DG and a red density signal DR.

The blue density signal DB, green density signals DG and the red density signal DR are then sent to a normalizing circuit 7, in which they are subjected to gamma compensation and sensitivity compensation in accordance with the sensitive material and in this way normalized. This is necessary because the gamma value and the sensitivity value, which indicate the relation between the exposure and the density, differ among different brands and types of photographic film and, therefore, the density value on different photographic films differs even when the same object is photographed under the same conditions.

For the reason described above, parameters are used for respective types of photographic film, a constant is added to the density signal by selecting a parameter so as to conduct sensitivity compensation, and thereafter the gain of the amplifier is adjusted to effect gamma compensation. In this way, the density signal is normalized so that the same density signal can be obtained with the same exposure of the object.

The blue density signal B, green density signal G and red density signal R normalized by the normalizing circuit 7 are then sent to a hue identifying circuit 8, which determines whether the hue at each measuring point is identical with the specific hue.

The hue of a specific object (called the memory color) is generally well known. Therefore, it is desirable that the hue of the object be finished to the natural hue on color paper for printing. For example, since the face, hands and legs of a person are flesh-colored, the color photograph is examined for the presence of skin color. In case the color photograph contains much flesh-color, it is regarded as a portrait and the exposure conditions are determined so as to print the flesh-colored area to a desirable flesh-color.

The above-mentioned memory colors include the colors of the skin, snow, lawn, sea, or the like. In the case of a portrait, the hue of the skin (flesh-color) differs with daylight and tungsten light. Therefore, it is also possible to determine the type of the light source by investigating the range of flesh-color on the color photograph. In this case, color compensation can be conducted according to the type of the light source.

The hue identifying circuit 8 stores definitions of one or more hue regions and identifies the region which the hue at each measuring point belongs to.

The results of the identification conducted by the hue identifying circuit 8 and the three-color density signals at each measuring point are sent to a CPU 10 via an interface 9 and written into a memory 11.

After the scanning of the image area, the data for the measuring points which are regarded as containing the predetermined hue are read out to calculate the mean value of the blue, green and red densities of the predetermined hue. The mean value thus obtained is then sent to the exposure control of a color printer, and the exposure is controlled so as to obtain the target density on color paper. For example, flesh-color is reproduced so that the face or the like printed on color paper is of the same hue as that perceived when the actual face or the like is viewed directly.

When the number of measuring points which are regarded as containing the predetermined hue is smaller than a predetermined value, it is considered that the region of the hue is not so important because the area thereof is small. Therefore, when the number of measuring points containing the predetermined hues is smaller than a predetermined value, printing may be conducted by the large area transmittance density method (LATD method) which is employed in the conventional color printer.

In case there are a plurality of hues to be extracted, a predominant hue is selected or a hue is selected according to a predetermined priority, and printing is carried out so as to satisfactorily reproduce the selected hue.

FIG. 2 shows an embodiment of the hue identifying circuit in accordance with the present invention. In FIG. 2, the normalized red density signal R and the normalized green density signal G are sent to an operation circuit 13, in which the difference therebetween is calculated. On the other hand, the green density signal G and the blue density signal B are sent to an operation circuit 14, in which the difference therebetween is calculated. The difference signals output from the operation circuits 13 and 14 are then converted to digital signals by A/D converters 15 and 16 respectively. These digital signals are used as high order and low order address signals to designate an address in a hue region memory 17 and read out the hue information stored at the address.

Namely, the hue region memory 17 stores hue data expressed in an orthogonal coordinate system the coordinate axes of which represent the quantized density differences R-G and G-B. For example, in case the predetermined hue is flesh-color, the flesh-color region is experimentally determined in the orthogonal coordinate system, and the flesh-color information is stored at the memory address corresponding to the quantized coordinates of the flesh-color region. The flesh-color information is for example coded so that the least significant bit of the memory data is 1 and the other bits 0. In this case, if the address designated by the density differences at a measuring point coincides with that of the flesh-color region, the hue region memory 17 outputs the hue information "000 ... 01". Therefore, it is possible to identify the flesh-color from the output level of the least significant bit of the hue information. When there are a plurality of hues to be detected, each bit of the hue information may be set to correspond to each hue. Alternatively, the hue information may be output in the form of a binary code signal and then decoded by a decoder.

The hue region memory 17 may be either a read only memory (ROM) or a random access memory (RAM). A RAM is advantageous because it makes it easier to change the predetermined hue region. However, with a RAM, data volatilizes when the power is cut and therefore the data must be written into the memory each time the power is cut off.

It is preferable that the hue region memory 17 have a large storage capacity because, in this case, the hue region boundary lines can be finely defined. For an ordinary color photographic film, it is practically sufficient for the address signals to consist of 12 bits each. In this case, the resolution of each of the A/D converters 15 and 16 may be 6 bits. The density differences R-G and G-B of most common objects are within the range of $\pm 1.0$ in terms of the density value. Therefore, if the density values are clipped with respect to this range, the minimum unit of the hue region is 0.03 in terms of density, which is considered sufficient for practical purposes.

In case a hue belonging to a region where at least one of the differences R-G and G-B is a negative value is to be extracted, one bit of the address signal may be used for the positive and negative signs.

The hue information output from the hue region memory 17 may directly be used as a hue detection signal. However, in the case of an over-exposure or under-exposure section, it is preferable that the hue region be shifted or prevented from being detected since the hue in that section is distorted. The hue deviating from the normal hue region can be checked by determining whether the mean value of the R, G and B densities is on the straight line of the characteristic curve of the mean value thereof or, more preferable, whether all of the R, G and B densities are on the straight lines of the respective characteristic curves.

In the embodiment shown in FIG. 2, an inadequate exposure detector 18 is employed to prevent the hue at the over-exposure and under-exposure sections from being detected. In the inadequate exposure detector 18, the mean value or the weighted mean value of the R, G and B densities is calculated by a mean value circuit 19 and then sent to comparators 20 and 21 to determine whether the mean value is between the upper and lower limit values. In this case, the upper limit value designates the boundary of over-exposure, while the lower limit value designates the boundary of under-exposure. Accordingly, a hue which is recorded on a color photographic film and which falls within the range defined by the upper and lower limit values is of adequate exposure and regarded as equivalent to the hue of the object. When the exposure is adequate, the output of an AND circuit 22 is 1.

The output signal of the AND circuit 22 and each output signal of the hue region memory 17 are input to each of AND circuits 23a to 23n, where they are ANDed with each other. Namely, when the exposure is regarded to be adequate from the mean value of R, G and B densities, one input terminal of each of the AND circuits 23a to 23n is activated, and the hue information forwarded from the hue region memory 17 to the other input terminal of each AND circuit is output from the AND circuit as a hue detection signal. If the exposure is regarded to be inadequate, the AND circuits 23a to 23n are closed and the hue information contained in the hue region memory 17 is not output.

In the above-described embodiment, the hue information output from the hue region memory 17 is prevented from being transferred when the exposure is inadequate. Alternatively, two hue region memories may be used, one for adequate exposure and one for inadequate exposure, and the output signal from the inadequate exposure detector 18 may be used as a chip enable signal to select one of the two hue region memories. In this case, it is possible to shift the hue region when the exposure is inadequate.

Figure 4:
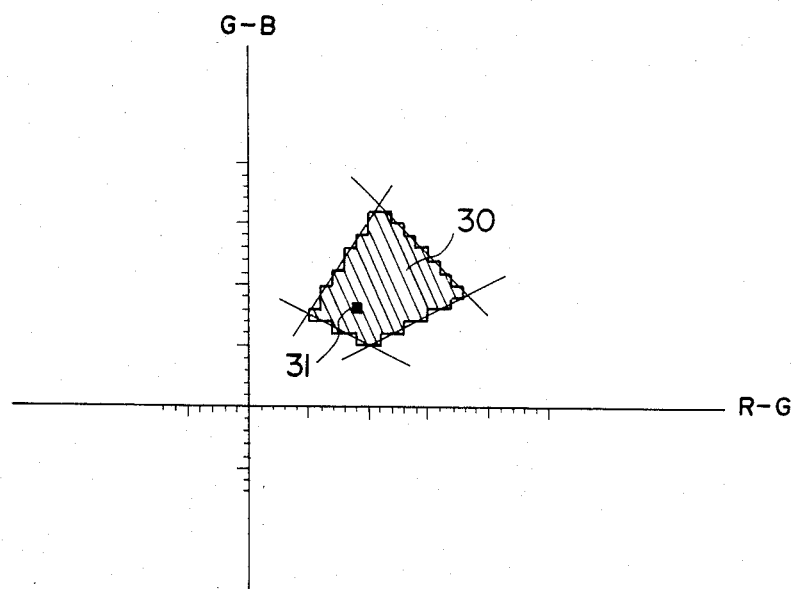
FIG. 4 is a graph showing a hue region identified by the apparatus in accordance with the present invention.

FIGS. 3 and 4 respectively show the shapes of the hue regions identifying by the conventional hue identifying apparatus and the apparatus in accordance with the present invention. FIG. 3 shows a hue region identified by the method described in Japanese unexamined Patent Publication No. 53(1978)-145621. In FIG. 3, a hatched flesh-color region 25 is, for example, defined by four straight lines 26 to 29. In this case, each of the straight lines 26 to 29 must be made to correspond to respective independent circuit element. As a result, the shape of the hue region becomes complicated, or the circuit construction becomes complicated when the number of hues to be detected increase.

FIG. 4 shows a hue region identified by the apparatus in accordance with the present invention. In FIG. 4, a hue region 30 is defined by applying a hue region quantization unit 31 which is determined by the resolution of the A/D converters 15 and 16 (FIG. 2). Accordingly, the hue region 30 can be approximated to the shape of the hue region shown in FIG. 3 by minimizing the hue region quantization unit 31. The quantization unit 31 is set suitably, taking the R, G and B accuracies, the accuracy of the definition of the hue region required, cost and the like into consideration.

FIG. 5 shows another embodiment of the apparatus in accordance with the present invention, in which a microcomputer is used. The red density signal R, green density signal G and blue density signal B are multiplexed by a multiplexer 34, which is controlled by a CPU 33, and sequentially converted to digital signals by an A/D converter 35. The output signal of the A/D converter 35 is fed into the CPU 33 which calculates the differences R-G and G-B. The results of the calculations are used as the address signals to read out the hue information stored in a hue region memory 36, and the read-out hue information is output as the hue detection signal.

Further, the CPU 33 calculates the mean value of the R, G and B densities as shown in FIG. 2 and determines whether the exposure is adequate or not. If the exposure is inadequate, the hue information is not read out from the hue region memory 36. It is also possible to store some sets of hue information in advance in a memory (ROM), read a set of hue information out of the memory by the CPU 33, and write it into the hue region memory 36. In this case, RAM is used as the hue region memory 36.

As described above, in the present invention, a hue is identified by use of a hue region memory storing the hue information at each address. The address is designated by a signal obtained by quantizing the difference between one combination of two of the three-color density signals and that between another combination of two of said signals. Accordingly, the hue identification can be conducted with one and the same apparatus of a simple construction even when the shape of the hue region is complicated or when many hues are to be detected. Further, the apparatus size can be minimized and its cost can be reduced since the hue region memory can be constructed from an LSI. Furthermore, the hue region can be changed easily only by rewriting the data or by replacing the hue region memory with one storing different data. Also, the digital system employed in the apparatus in accordance with the present invention to identify the hue provides improved accuracy and stability.

In addition, an inadequate exposure detecting means is employed in the apparatus of the present invention so as to prevent the hue detection signal from being output or to change the hue region if the exposure is inadequate. Accordingly, it is possible to prevent the hue identification from being conducted erroneously.

It should be noted that the present invention can also be applied to other purposes similar to photographic color printing, in, for example, the fields of typographic color printing and the like.

We claim:

1. A hue identifying apparatus comprising a means for creating an M-bit high order address signal and an N-bit low order address signal, wherein M and N each designate an arbitrary integer, from the difference between a combination of two of the red, green and blue density signals read out at each point on a color photographic film and from the difference between another combination of two of said density signals, respectively, and a hue region memory storing at each address the hue information based on a predetermined hue region defined with respect to a two-dimensional coordinate system wherein the coordinate axes represent quantized values of said differences, said address being designated by said high order and low order address signals.

2. An apparatus as defined in claim 1 wherein said address signal creating means comprises two operation circuits for calculating said differences between two color densities, and two A/D converters for quantizing the output signals of said operation circuits.

3. An apparatus as defined in claim 1 wherein said address signal creating means comprises an A/D converter for quantizing the three-color density signals, and an operation means for creating the high order and low order address signals by calculating the difference between a combination of two of said quantized three-color density signals and that between another combination of two of said signals.

4. An apparatus as defined in claim 3 wherein a multiplexer for multiplexing the density signals is provided at a stage prior to said A/D converter, and said operation means is a CPU.

5. An apparatus as defined in claim 1 wherein each bit of the data output from said hue region memory corresponds to one detected hue.

6. An apparatus as defined in claim 1 wherein a detected hue is output from said hue region memory in the form of a binary code signal.

7. An apparatus as defined in claim 1 wherein said hue region memory is a RAM whose content can be rewritten.

8. A hue identifying apparatus comprising a means for creating an M-bit high order address signal and an N-bit low order address signal, wherein M and N each designate an arbitrary integer, from the difference between a combination of two of the red, green and blue density signals read out at each point on a color photographic film and from the difference between another combination of two of said density signals respectively; a hue region memory storing at each address the hue information based on a predetermined hue region defined with respect to a two-dimensional coordinate system wherein the coordinate axes represent quantized values of said differences, said address being designated by said high order and low order address signals; a means for detecting inadequate exposure based on the three-color density signals at each said point; and a means for obstructing the transfer of the hue information, which is output from said hue region memory, based on the output signal of said inadequate exposure detecting means.

9. An apparatus as defined in claim 8 wherein said inadequate exposure detecting means comprises a mean value circuit for calculating the mean value of the three-color density signals, two comparators for determining whether said calculated mean value falls within a predetermined range, and an AND circuit for ANDing the output signals of said comparators with each other.

10. An apparatus as defined in claim 8 wherein said inadequate exposure detecting means comprises comparators for determining whether each of the three-color density signals falls within a predetermined range, and an AND circuit for ANDing the output signals of said comparators.

11. A hue identifying apparatus comprising a means for creating an M-bit high order address signal and an N-bit low order address signal, wherein M and N each designate an arbitrary integer, from the difference between a combination of two of the red, green and blue density signals read out at each point on a color photographic film and from the difference between another combination of two of said density signals respectively; a plurality of hue region memories storing at each address the hue information based on a predetermined hue region defined with respect to a two-dimensional coordinate system wherein the coordinate axes represent quantized values of said differences, said address being designated by said high order and low order address signals; a means for detecting inadequate exposure based on the three-color density signals at said each point; and a means for selecting one of said plurality of hue region memories based on the output signal of said inadequate exposure detecting means.

* * * * *